UNITED STATES PATENT OFFICE.

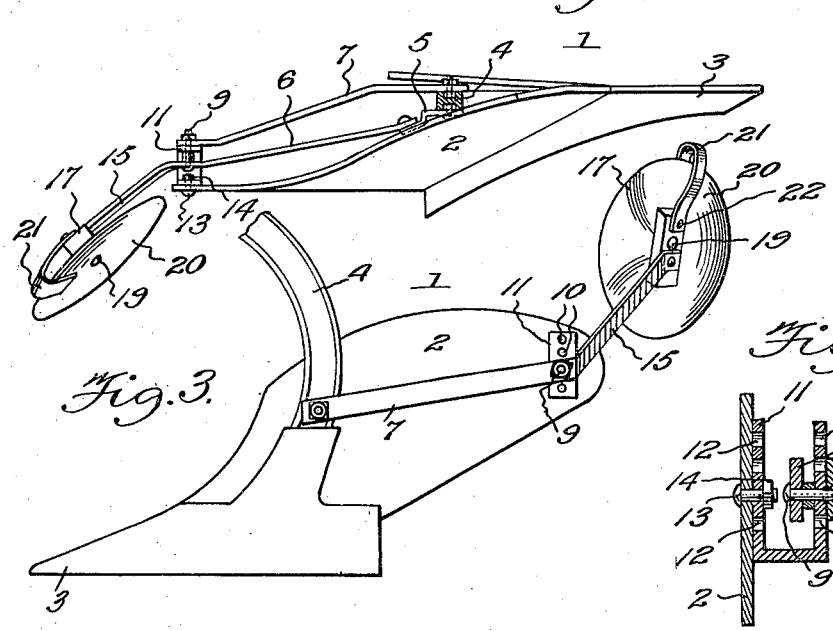

GEORGE W. GOSS, OF BALTIMORE, OHIO.

COMBINED PLOW AND HARROW.

1,320,851. Specification of Letters Patent. Patented Nov. 4, 1919.

Application filed August 3, 1918. Serial No. 248,097.

*To all whom it may concern:*

Be it known that I, GEORGE W. Goss, a citizen of the United States, residing at Baltimore, in the county of Fairfield and State of Ohio, have invented certain new and useful Improvements in Combined Plows and Harrows, of which the following is a specification.

This invention relates to plows, and with regard to its more specific features, has particular reference to a combined plow and harrow, whereby through the use of which a plow constructed in accordance with my invention will be capable of completely turning over a furrow and at the same time will be thoroughly pulverized or harrowed so as to be in a thoroughly broken up condition.

The primary object of the invention resides in equipping the moldboard of a plow at the rear furrow discharging end thereof with a rotatable disk member which is preferably located at an obtuse angle with respect to the longitudinal plane of the moldboard whereby during the travel of the furrow across the face of the moldboard, the same will be caused to be forced into engagement with the disk member so that a complete turn over of the furrow will be effected and the latter thoroughly pulverized and ground.

Another object of the invention is to provide means for adjusting the depth of cutting action of the disk member so as to accommodate the same to soil of various properties.

With these and other objects in view, as will appear as the description proceeds, the invention accordingly consists in novel features of construction, combination of elements, and arrangement of parts hereinafter fully described and having the scope thereof defined by the appended claims.

In the accompanying drawing, forming a part of this specification, and in which similar characters of reference denote like and corresponding parts:

Figure 1 is a perspective view of a plow, illustrating the improved harrowing attachment applied thereto.

Fig. 2 is a top plan view of the structure disclosed in Fig. 1.

Fig. 3 is a rear elevation, and

Fig. 4 is a detailed transverse sectional view disclosing the disk adjustment.

In the form of the invention exemplified in the accompanying drawing, the numeral 1 represents any suitable form of a horse or tractor drawn plow, which latter as usual, comprises a moldboard 2, plow share 3 and a draft standard 4.

Connected with the standard and with the moldboard, and at a point to the rear of the latter, is a rearwardly extending angular arm 5, to which is pivotally connected a rearwardly extending disk beam 6. Also connected with the standard 4 on the side opposite to the arm 5 is a bar 7 disposed to extend substantially parallel with the beam 6. The outer end of this bar 7 is provided with an aperture 8, through which a supporting bolt 9 for the beam 6 extends. This bolt also passes through one of a series of vertically disposed openings 10 formed in a U shaped bracket 11 carried by the rear face of the moldboard 2. The opposite leg of this bracket is also provided with a series of vertically alined openings 12, one of which being adapted to receive a threaded bolt 13, which passes through the moldboard and has its outer threaded end equipped with a nut 14. By virtue of this construction, the height of the bracket 11 may be readily varied. The bolt 9 also passes through an opening formed in the medial portion of the beam 6, whereby said beam will be supported in an operative position. It will be appreciated that owing to the arrangement of the apertures 8, the height of the bolt 9 may be readily adjusted, thus causing a corresponding adjustment in height of the beam 6, and if further adjustment is desired, the same may be taken care of by means of the bolt 13 and its coöperative openings 12 formed in the bracket 11.

The outer end of the beam is angularly bent as at 15, to extend beyond the outer face of the moldboard for a considerable distance, and secured to the extreme outer end of the portion 15 is a bearing block 17, whereby said block will be rigidly and firmly supported in connection with the beam. The block is centrally provided with an opening for the reception of a stud shaft 19, which shaft rotatably carries a disk member 20. Owing to the angular location of the portion 15 of the beam, this disk member will be located at an obtuse angle with respect to the furrow forming surface of the moldboard 2, and at a point immediately to the rear of the latter, so that a furrow traveling along the face of the moldboard will be brought into contact with the cutting edge of the disk member. Hence, owing to the location of the disk member, a furrow created by the moldboard will be completely turned over and will furthermore be harrowed or pulverized so as to eliminate lumps and other objectionable formations in the plowed furrow, thus rendering the soil more thoroughly adapted for planting. The action of the traveling furrow over the face of the disk member causes the latter to revolve in the direction of the arrow B thus eliminating undue friction thereon and at the same time serving to reduce draft power. In fact, it is calculated that the addition of the disk member will not increase to any appreciable extent the normal power required to effect movement, on part of the plow, and at the same time to accomplish the dual purpose of plowing and harrowing the soil.

To prevent accumulation of soil on the working face of the disk member, there is provided a scraper element 21, which latter in this instance, comprises a metallic bar bent to assume substantially U shaped configuration. One end thereof being secured as at 22 to the bearing block 17 and the other end being disposed to resiliently engage with the face of the disk member, the location of this latter end of the scraper element being such that all soil which may accumulate and adhere upon the face of the disk member will be removed from engagement with the latter by contacting with the scraper element, so that a clean working face will be presented to each newly turned furrow.

From the foregoing it will be gathered that there is provided a plow attachment of considerable utility and one wherein plowing and soil harrowing is accomplished by a single operation, the location of the disk member being such that a furrow will be completely formed or turned over and at the same time ground or pulverized by the disk member. If desired, the height or cutting depth of said disk member may be varied by adjusting the beam 6 within the bracket 11 so that the same may be readily accommodated to soil of varying properties. It will be appreciated that the attachment may be employed in connection with either tractor or horse drawn plows, or that other means may be provided from that shown to effect the adjustment of the disk member. This disk member should not be confused with rotatable moldboards, but on the other hand is relatively independent of the moldboard and simply serves to finish the soil after the latter is freed from engagement with the plow.

I claim:

1. A harrowing attachment for plows, comprising a beam member pivotally attached at its forward end to the rear side of a plow structure, the opposite end of said member terminating in an angularly offset portion situated to the rear of the moldboard of said structure, a disk element rotatably carried by said angularly offset portion and mounted to transversely slice furrows turned over by said moldboard, and a bracket device situated intermediately of the ends of said beam member and co-acting with the latter to govern the cutting depth of said disk element.

2. A harrowing attachment for plows, comprising a beam member pivotally attached at its forward end to the rear side of a plow structure, the opposite end of said member terminating angularly and rearwardly of the moldboard of said structure, a disk element rotatably carried upon the rear end of said beam member and mounted to transversely slice furrows turned over by said moldboard, a bracket device carried by said moldboard and arranged to receive the intermediate portions of said beam member, said bracket being provided with vertically disposed openings, any one of which being arranged to register with a similar opening formed in said beam member, and a bolt member arranged to pass through such alining openings to control the cutting depth of said disk element.

In testimony whereof I affix my signature.

G. W. GOSS.